United States Patent
Wedner

(10) Patent No.: US 9,004,826 B2
(45) Date of Patent: Apr. 14, 2015

(54) SOLID STEP DRILL

(75) Inventor: Hans Wedner, Vara (SE)

(73) Assignee: Sandvik Intellectual Property AB, Sandviken (SE)

( * ) Notice: Subject to any disclaimer, the term of this patent is extended or adjusted under 35 U.S.C. 154(b) by 641 days.

(21) Appl. No.: 12/659,549

(22) Filed: Mar. 12, 2010

(65) Prior Publication Data

US 2010/0254779 A1    Oct. 7, 2010

(30) Foreign Application Priority Data

Apr. 7, 2009    (SE) ...................................... 0950223

(51) Int. Cl.
*B23B 51/02*    (2006.01)
*B23B 51/00*    (2006.01)

(52) U.S. Cl.
CPC ........... *B23B 51/009* (2013.01); *B23B 2251/48* (2013.01)

(58) Field of Classification Search
USPC ................ 408/223, 224, 227, 230, 229, 231; 407/115, 116
See application file for complete search history.

(56) References Cited

U.S. PATENT DOCUMENTS

| | | | |
|---|---|---|---|
| 2,322,894 A | | 6/1943 | Stevens |
| 2,897,695 A | * | 8/1959 | Winslow .................. 408/224 |
| 3,199,381 A | * | 8/1965 | Mackey .................... 408/226 |
| 4,189,266 A | | 2/1980 | Koslow |
| 4,480,951 A | * | 11/1984 | Regensburger .............. 408/224 |
| 5,160,232 A | | 11/1992 | Maier |
| 5,302,060 A | * | 4/1994 | Nystrom et al. ............ 408/224 |
| 5,816,753 A | * | 10/1998 | Hall .......................... 408/224 |
| 6,030,155 A | | 2/2000 | Scheer et al. |
| 7,632,050 B2 | * | 12/2009 | Nuzzi et al. ................. 408/224 |
| 2003/0202853 A1 | * | 10/2003 | Ko et al. ..................... 408/225 |

(Continued)

FOREIGN PATENT DOCUMENTS

| | | |
|---|---|---|
| CN | 88 2 03889 U | 11/1988 |
| DE | 196 05 157 A1 | 9/1996 |

(Continued)

OTHER PUBLICATIONS

Cutting Machining Technical Guide; P.E32; published by AB Sandvik Coromant, Oct. 2005.

(Continued)

*Primary Examiner* — Eric A Gates
*Assistant Examiner* — Paul M Janeski
(74) *Attorney, Agent, or Firm* — Morgan, Lewis & Bockius LLP

(57) ABSTRACT

A solid step drill, including a front tip and a rear end between which a center axis extends and around which the drill is rotatable in a predetermined direction. At least two cylindrical sections are concentric with the center axis, a first section extending rearward from the front tip and having a first diameter, and a second section extending behind the first section and having a second diameter that is greater than the first diameter, the first section transforming into the second section via a step. The tip includes two primary cutting edges, which individually co-operate with a respective chip flute that is delimited by a concave surface and countersunk in the first section and in the second section, the respective chip flute intersecting the step while forming a secondary cutting edge. Adjacent to the secondary cutting edge, a chip breaking recess is formed between a cutting edge line of the cutting edge and the concave surface.

8 Claims, 3 Drawing Sheets

(56) References Cited

U.S. PATENT DOCUMENTS

| | | | |
|---|---|---|---|
| 2006/0029477 A1* | 2/2006 | Anjanappa et al. | 408/230 |
| 2006/0210949 A1* | 9/2006 | Stoop | 433/165 |
| 2008/0298918 A1 | 12/2008 | Brink | |

FOREIGN PATENT DOCUMENTS

| | | | |
|---|---|---|---|
| DE | 20 2008 000 368 U1 | | 3/2008 |
| FR | 725 363 A | | 5/1932 |
| JP | 2-150112 U | | 12/1990 |
| JP | 04275813 A | * | 10/1992 |
| JP | 10029107 A | * | 2/1998 |
| JP | 2001105216 A | * | 4/2001 |
| JP | 2001-239412 | | 9/2001 |
| JP | 2002172508 A | * | 6/2002 |
| JP | 2004306180 A | * | 11/2004 |
| JP | 2006346832 A | * | 12/2006 |
| KR | 2001035199 A | * | 5/2001 |
| WO | 00/44518 | | 8/2000 |

OTHER PUBLICATIONS

Notification of First Office Action (and English translation) for Chinese Application No. 201010158564.X dated Mar. 12, 2013.
Office Action for European Application No. 10 156 830.1, dated Apr. 8, 2013.
JPO Communication—Office Action—Notice of Reasons for Rejection for Japanese Patent Application No. 2010-088521—Issued on Jan. 21, 2014 (Including English Translation).
Decision of Rejection (with English translation) in Chinese Patent Application No. 201010158564.X dated Jun. 10, 2014.

* cited by examiner

SOLID STEP DRILL

This application claims priority under 35 U.S.C. §119 to Swedish Patent Application No. 0950223-8, filed on Apr. 7, 2009, which is incorporated by reference herein in its entirety.

FIELD OF THE INVENTION

The present invention relates generally to a solid step drill of the type that includes a front tip and a rear end, between which a center axis extends around which the drill is rotatable in a predetermined direction, and with which at least two cylindrical sections are concentric, viz. a first section, which extends rearward from the front tip, has a first diameter, and transforms via a step into a second section being behind and having a second, greater diameter, the tip including two integrated, primary cutting edges, which individually have a chip surface and a clearance surface and co-operate with a chip flute each that is countersunk not only in the first section but also in the second one, and the individual chip flute intersecting the step while forming a secondary, integrated cutting edge the chip surface of which is included in the chip flute.

BACKGROUND OF THE INVENTION

Drills for hole making in workpieces of metal by chip removing or cutting machining may be divided into different categories depending on a number of different factors, such as the desired shape, length and diameter of the holes that are to be made, the nature of the materials in the workpieces, the desired dimensional accuracy in the holes, the fundamental construction or design of the drill, etc. Among other things there is a sharp borderline between, on one hand, solid drills and, on the other hand, non-solid drills, the first-mentioned ones of which are distinguished by the fact that all the necessary details, such as cutting edges (with the ensuing chip surface and clearance surface), chip evacuation channels, guide pads, flushing fluid channels, etc., are included in a solid drill body of a suitable material, such as cemented carbide, high speed steel, or the like. Refer to, for instance, p. E32 in the catalogue "Cutting Machining Technical Guide," published by AB Sandvik Coromant October 2005. A fundamental advantage of solid drills is that all details, and in particular the cutting edges, can be manufactured with high precision and dimensional accuracy. They are therefore suitable for applications in which the requirements of the position precision and the dimensional accuracy of the holes are high. They are used to a great extent also for the drilling of holes of a limited diameter (e.g. <12 mm). A drawback with solid drills is, however, that they have to be either discarded or, if possible, reground when the cutting edges have been worn out. This may at times cause expenses that may be high.

The category of non-solid drills is heterogeneous and includes a plurality of different types of drills, such as indexable insert drills, loose top drills and drills having soldered cutting inserts. Common to these types of drills is that the cutting edges required to carry out chip removal are included in particular wear parts, which are manufactured from another, harder and more hard-wearing material than the material otherwise in the drill body. In indexable insert drills, the cutting edges are included in replaceable, indexable inserts, and in loose top drills, the same are included as integrated parts of a replaceable loose top, which can be interconnected with a reusable drill or basic body. Also in the third type of drills, the cutting edges are included in cutting inserts that, like the indexable inserts, usually consist of cemented carbide (or alternatively useful, hard materials), but that are soldered or otherwise semi-permanently united to the proper basic body (that usually consists of steel). An advantage of non-solid drills is that the same do not necessarily have to be discarded or require regrinding of the cutting edges, when their sharpness has been lost. Accordingly, indexable inserts and loose tops can rapidly and easily be exchanged in a mechanical way, while soldered cutting inserts can be removed in a thermal way and either be reground or replaced by new ones. In other words, the proper basic body or drill body is in this case reusable for a plurality of insert exchanges (usually 10-20). A disadvantage of all types of non-solid drills is, however, that the drill body and the cutting edge-carrying wear parts are not integrated with each other, but rather of mutually different nature, above all in respect of the properties of the different materials (e.g., steel/cemented carbide), besides which the wear parts have to be connected or interconnected with the basic body via interfaces in which sources of error may arise. In other words, non-solid drills are less reliable when high precision is desired.

Another borderline between two main categories of drills goes between single drills and step drills. Single drills include only one set of cutting edges in a front tip of the drill body and can make a hole having one and the same diameter along the entire length thereof. The step drill, however, can in one and the same operation drill holes in consecutive sections having different diameters, more precisely by including not only one set of cutting edges in the tip of the drill body, but also in one or more so-called steps that are formed at a distance behind the tip and have a greater diameter than the tip, and include additional cutting edges that can generate additional hole sections having a successively increasing diameter. To the category of step drills belong, furthermore, a number of varying types of drills, such as twist drills (having helicoidal chip flutes) and tap borers (having straight chip flutes). The step drills may furthermore be formed either as solid drills or as non-solid drills, e.g., indexable insert drills or drills having soldered cutting inserts.

An important factor in order for drills most generally to work satisfactory and give good machining results is that the chip formation and the chip evacuation are carried out in a way that is expedient for the application in question. In certain cases, drills are used for hole making in short-chipping materials, i.e., materials having a low ductility, such as cast iron, wherein the removed chips become fairly short (often comma-shaped) and easy to evacuate via the chip flutes of the drill. However, other, more ductile materials, such as low-carbon steel, aluminium, copper, titanium and acid-proof steel, generate most often long chips which are difficult to handle, which may cause the most detrimental problems such as chip jamming, impaired hole quality, entanglement in the driving machine, and even risks of accidents. In step drills, these problems may become accentuated as a consequence of the fact that at least two types or sets of long chips are to be evacuated via mutual chip flutes, viz. not only a first set generated by the primary cutting edges in the tip of the drill, but also at least one second set generated by the secondary cutting edges in the step or steps of the drill. Because all chips have to be evacuated via common chip flutes, the risk of entanglement and chip jamming becomes extra great.

In this connection, it should also be pointed out that narrow chips generated by short cutting edges often remain long and unbroken, while wider chips generated by longer cutting edges are inclined to break easier and become acceptably short. Another factor that affects the chip formation is the angle between cutting edges co-operating in pairs. Hence, the primary cutting edges usually have a so-called nose angle within the range of 120-160°, while the corresponding angle (step angle) between the secondary cutting edges may vary most considerably all the way from 180° to approximately 40°. If the step angle is great, the chip is directed more axially than if the same is small. In the last-mentioned case, the chip is directed more radially and therefore gets an increased tendency to coil into tangles that may cause severe chip jamming.

The problems of mastering the forming and evacuation of chips in long-chipping materials have, at least to a certain extent, been solved in connection with non-solid step drills, viz. by the fact that already in connection with the manufacture of the separate cutting inserts applied to the drill afterwards, the cutting inserts are designed with special chip breakers, which at an early stage of the cutting process can break the chip and split the same into short pieces. An example of a step drill having semi-permanently attached cutting inserts is disclosed in WO00/44518, which shows how a laminated cutting insert having a built-in chip breaker can be soldered or otherwise semi-permanently attached to a step drill with the purpose of mastering the chip formation and evacuation. A disadvantage of non-solid drills in general and, in particular, of step drills is, however, that various sources of error may occur in connection with the mounting or fastening of the separate cutting inserts, more precisely in respect of the position precision of the cutting inserts and cutting edges in relation to the rest of the drill body. For this reason, non-solid step drills are poorly suitable for such hole making where the requirements of the position precision of the holes are particularly great.

The present invention aims at obviating the disadvantages of previously known solid step drills and at providing an improved solid step drill. An object of the invention is to provide a solid step drill that generates holes with high precision without giving rise to difficulties with the forming and evacuation of long chips. In doing so, not only the cylindrical hole walls made with different diameters and generated by the respective cutting edges should be possible to be given a high dimensional accuracy, but also the ring-shaped (usually conical) transition surface that is formed between the respective hole walls should be possible to be given a high dimensional accuracy.

SUMMARY OF THE INVENTION

In an embodiment, the invention provides a solid step drill, including a front tip and a rear end between which a center axis extends and around which the drill is rotatable in a predetermined direction. At least two cylindrical sections are concentric with the center axis, a first section extending rearward from the front tip and having a first diameter, and a second section extending behind the first section and having a second diameter that is greater than the first diameter, the first section transforming into the second section via a step. The tip includes two primary cutting edges, which individually co-operate with a respective chip flute that is delimited by a concave surface and countersunk in the first section and in the second section, the respective chip flute intersecting the step while forming a secondary cutting edge. Adjacent to the secondary cutting edge, a chip breaking recess is formed between a cutting edge line of the cutting edge and the concave surface.

The invention is based on the understanding that the difficulties with the chip formation and the chip evacuation in solid step drills can be overcome by forming in the vicinity of at least one of the secondary cutting edges (and suitably both) a recess, in which the chip immediately after the commenced removal can dive in and during its passage be formed along the limiting surface of the recess and/or broken off before it enters the proper chip flute. This means that the chip formation is not exposed to unpredictable conditions of the type that are at hand when the (concave or plane) limiting surface of the chip flute extends all the way up to the cutting edge line of the cutting edge in question.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
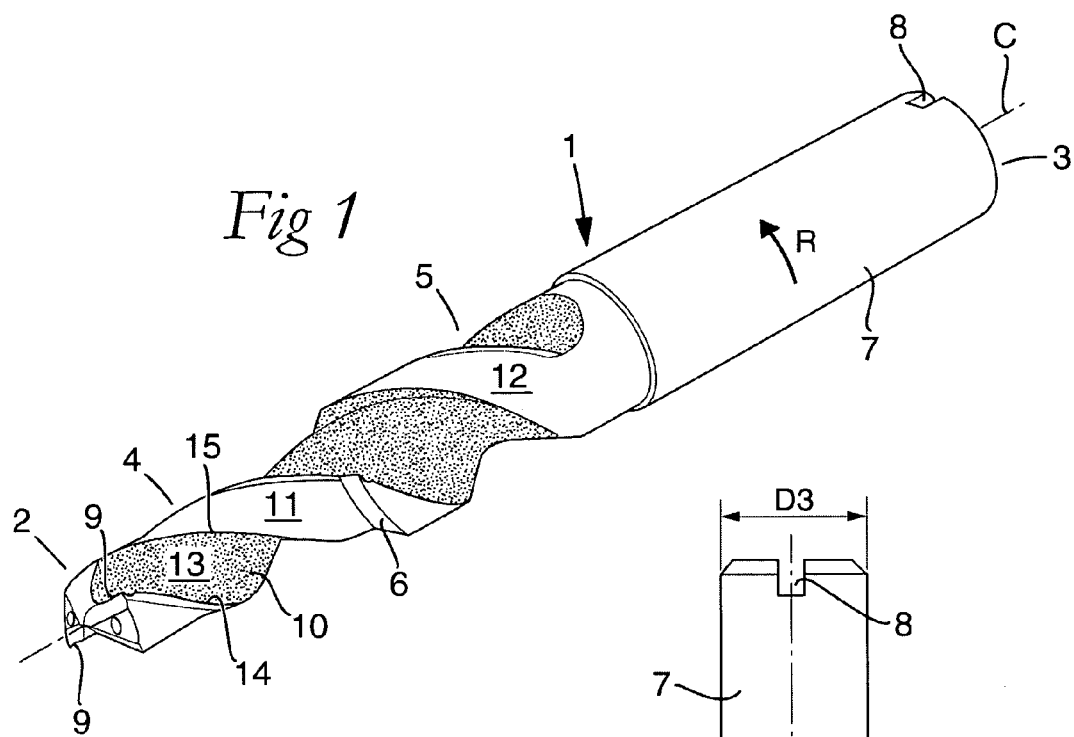
FIG. 1 is a perspective view of a solid step drill according to an embodiment of the invention.
Figure 2:
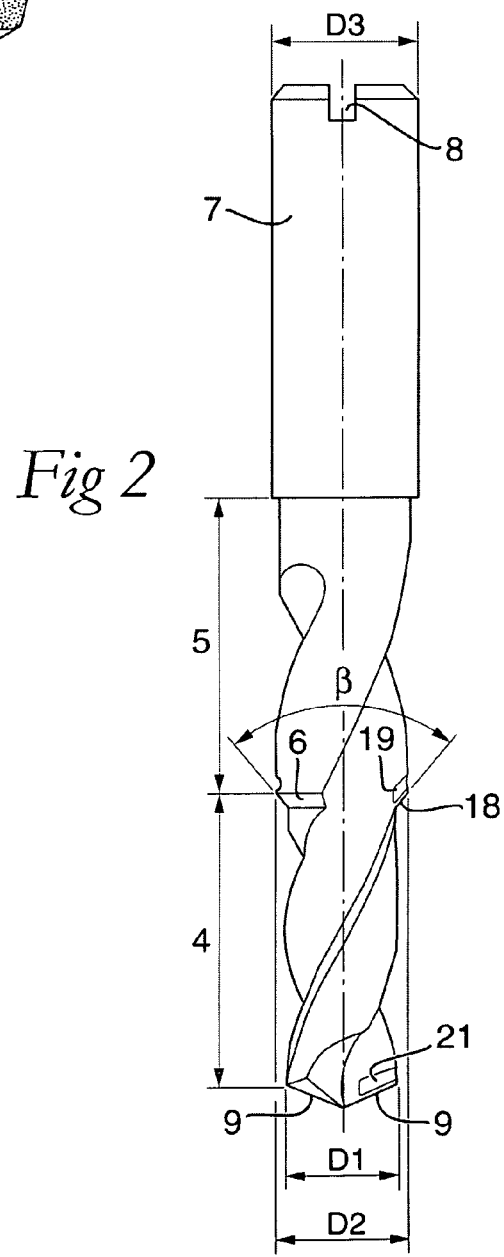
FIG. 2 is a side view of the same step drill.

In the drawings, the embodiment is exemplified in the form of a solid step drill made as a twist drill, i.e., the chip flutes of the drill are in this case helicoidal (contrary to the straight chip flutes found in so-called tap borers). The drill is in the form of a long narrow body 1, which comprises a front tip 2 and a rear end 3 between which a center axis C extends around which the drill is rotatable in a predetermined direction R. Two essentially cylindrical sections in the body are concentric with the center axis C, viz. a first, front section 4 that extends rearward from the tip 2, and a second section 5 being behind, which is spaced-apart from the first section via a so-called step 6. As is seen in FIG. 2, the front section 4 has a diameter D1 that is smaller than the diameter D2 of the second section 5. In this case, also a rear fastening part 7, the diameter D3 of which is greater than D2, is included in the drill. For the transfer of torque to the drill, the fastening part 7 is in this case formed with a groove 8 in the end surface 3 that represents the rear end of the drill.

In the tip 2, two primary cutting edges 9 are included, which each co-operate with a chip flute 10. The first section includes an envelope surface 11 that via the step 6 is spaced-apart from an envelope surface 12 included in the second section 5. The two helicoidal chip flutes 10 are countersunk in the envelope surface 11 of the first section 4 and extend rearward through the second section 5, where they widen. Each chip flute is delimited by a concave limiting surface 13, which extends between a pair of edge lines or borderlines 14, 15, the first-mentioned one of which is included in a conventional guide pad 16 (refer to FIG. 4) that only runs along the first section. The guide pad has the purpose of guiding the drill after the same has entered the workpiece.

Figure 6:
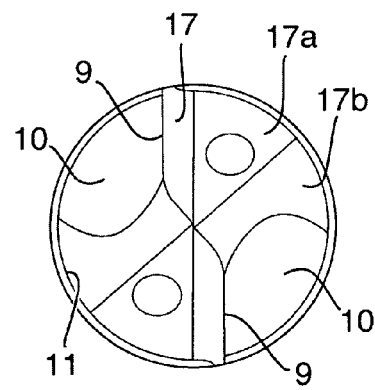
FIG. 6 is an end view from the front.

As is seen in FIG. 6, the individual cutting edge 9 includes a first clearance surface 17 that transforms into two clearance surfaces 17a, 17b being (rotationally) behind, the last-mentioned one of which forms a transition toward a chip flute. The chip surface of the cutting edge 9 is formed by the fact that the chip flute surface 13 runs out in the tip.

As a consequence of, on one hand, the fact that the rear section 5 has a diameter D2 that is greater than the diameter D1 of the front section 4, and, on the other hand, the fact that each chip flute runs continuously through the two sections, secondary cutting edges 18 are formed where the chip flute intersects the surface 6 that in this case is conical and forms the so-called step. Each such secondary cutting edge or step edge 18 is delimited by, on one hand, the concave limiting surface 13 of the chip flute, and, on the other hand, the part of the step surface 6 that connects to the cutting edge and forms a clearance surface of the same.

Figure 4:
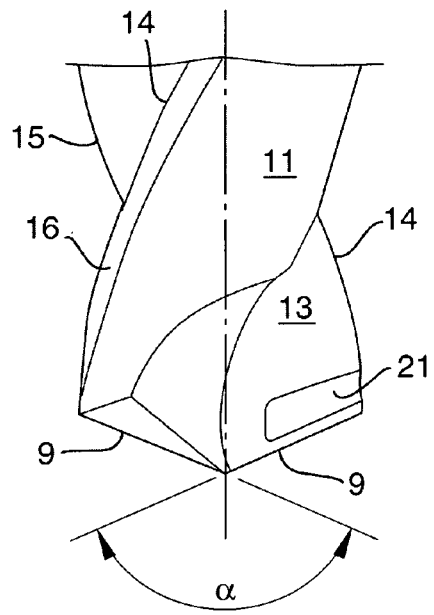
FIG. 4 is a sectioned side view showing the tip of the step drill.

In FIG. 4, α designates the nose or tip angle of the two primary cutting edges 9. This angle is usually within the range of 120-160°, and amounts in the example to approx. 130°. The step angle β (refer to FIG. 2) between the secondary cutting edges 18 amounts in the example to 90°, but may vary most considerably all the way from an extreme value 180° to approximately 40°.

Figure 7:
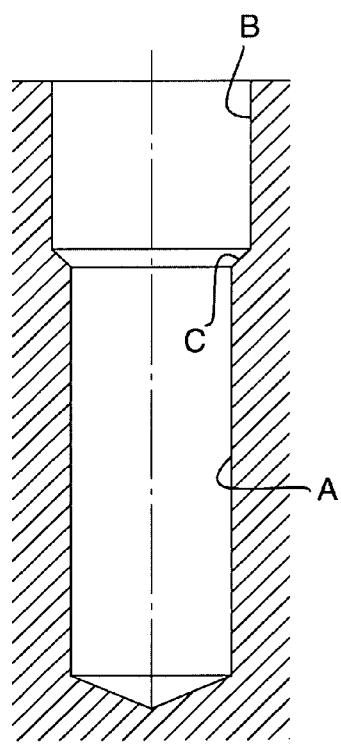
FIG. 7 is a longitudinal section showing the shape of a hole drilled by the step drill in question.

In FIG. 7, it is illustrated how the drill generates a hole having two cylindrical hole walls A, B, which are spaced-apart by a conical transition surface C generated by the step edges 18.

Figure 3:
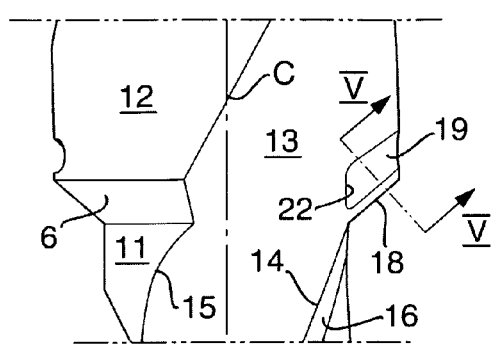
FIG. 3 is a sectioned, detailed side view showing the design of the drill in the area of a step.
Figure 5:
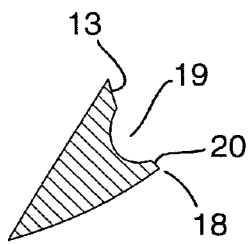
FIG. 5 is a detailed section V-V in FIG. 3.

Adjacent to the individual secondary cutting edge or step edge 18, a recess 19 is formed, in which the chips can be formed into a favourable chip shape and/or be broken into short pieces. In the embodiment shown in FIGS. 3 and 5, the recess 19 has the shape of a chute that is countersunk in the chip surface 13 and spaced-apart from the cutting edge line of the step edge 18 via a reinforcement bevel 20. The dimensions and shape of the chute 19 as well as of the reinforcement bevel 20 may vary most considerably depending on the material in which the drill is intended to work. As is seen in FIG. 3, the chute 19, in this case, runs out in the envelope surface 12 of the section 5 and extends along the entire length of the step edge 18, the inner end 22 of the chute being located at a radial distance from the center axis C that is approximately as great as the radius of the envelope surface 11. In other words, the inner end of the chute is located approximately in the area of the inner end of the step edge 18 in order to interfere as little as possible with the chip flute surface 13 in the area where the same runs past the step 6 into the rear section 5.

When the individual cutting edge 18 during the rotation of the drill removes a chip, the same will, immediately behind the reinforcement bevel 20 (refer to FIG. 5), dive down into the chute 19 and during its passage along the concave limiting surface thereof be broken off before it reaches the chip flute surface 13 being (axially) behind. In such a way, a favourable chip breaking and formation is provided before the chip is further fed in the direction axially rearward through the chip flute. By imparting the chute with a suitable shape and placement, the direction of motion of the chip during the movement from the cutting edge can be controlled so that the chip evacuation becomes optimal. In general, the chip evacuation is improved the more axially the chip is directed.

In practice, the chip breaking chute can be provided by grinding, e.g., by a grinding pin, in an after-machining operation when the chip flutes and cutting edges of the drill have been finished. Also other machining e.g., sparking, is feasible. Because the described step drill is solid, the machining is naturally carried out in one and the same material, e.g., cemented carbide, as the drill in its entirety is manufactured from.

In the shown embodiment, an analogous chute 21 is also formed adjacent to each primary cutting edge 9 in the tip of the drill.

Figure 8:
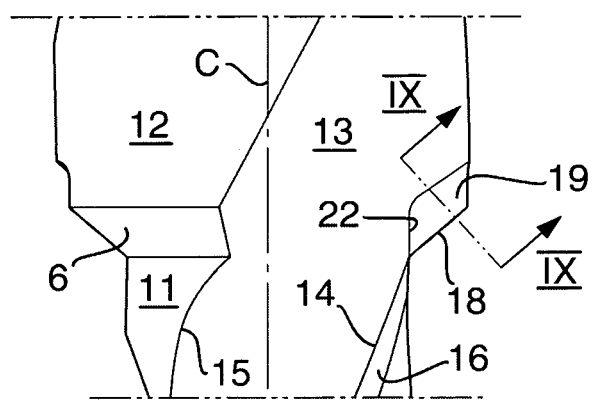
FIG. 8 is a detailed side view corresponding to FIG. 3 showing an alternative embodiment of the invention.
Figure 9:
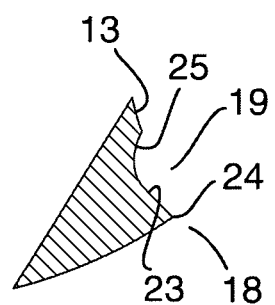
FIG. 9 is a detailed section IX-IX in FIG. 8.

In FIGS. 8 and 9, an alternative embodiment of a chip breaking recess 19 is shown. In this case, the recess is delimited by a chip surface 23 in the immediate proximity of the cutting edge line 24 at which the chip surface 23 meets the envelope surface of the second section 5, as well as by a concave part surface 25 situated between the chip surface 23 and the chip flute surface 13. When the chip is initially removed from the workpiece, the same will slide along the chip surface 23 and thereafter be formed and/or broken against the concave part surface 25 before it reaches the chip flute surface 13.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A solid step drill, comprising:
   a body with front tip and a rear end between which a center axis extends and around which the drill is rotatable in a predetermined direction; and
   at least two cylindrical sections concentric with the center axis, a first section extending rearward from the front tip and having a first envelop surface with a first diameter, and a second section extending behind the first section and having a second envelop surface with a second diameter that is greater than the first diameter, the first section transforming into the second section via a step connecting the first envelop surface and the second envelop surface;
   wherein the tip includes two primary cutting edges, which individually co-operate with a respective chip flute that is delimited by a concave surface and countersunk in the body in the first section and in the second section, the respective chip flute intersecting the step while forming in the body a secondary cutting edge,
   wherein adjacent to each secondary cutting edge, a chip breaking recess is formed in the body between a cutting edge line of the secondary cutting edge and the concave surface,
   wherein an inner end of the chip breaking recess does not extend radially inward of the first envelop surface,
   wherein the two primary cutting edges and the two secondary cutting edges are integrated with the body of the solid step drill, and
   wherein the recess is delimited by a chip surface in the immediate proximity of the cutting edge line of the secondary cutting edge, as well as by a concave, chip breaking surface situated between the chip surface and the chip flute surface.

2. The step drill according to claim 1, wherein adjacent to the individual primary cutting edge, a chip breaking recess is also formed between a cutting edge line of the primary cutting edge and the concave surface.

3. A step drill, comprising:
   a body with front tip and a rear end between which a center axis extends and around which the drill is rotatable in a predetermined direction; and
   at least two cylindrical sections concentric with the center axis, a first section extending rearward from the front tip and having a first envelop surface with a first diameter, and a second section extending behind the first section and having a second envelop surface with a second diameter that is greater than the first diameter, the first section transforming into the second section via a step connecting the first envelop surface and the second envelop surface;

wherein the tip includes two primary cutting edges, which individually co-operate with a respective chip flute that is delimited by a concave surface and countersunk in the body in the first section and in the second section, the respective chip flute intersecting the step while forming in the body a secondary cutting edge, wherein adjacent to the secondary cutting edge, a chip breaking recess is formed in the body between a cutting edge line of the secondary cutting edge and the concave surface, wherein the recess ends in an inner end located at a radial distance from the center axis that is as great as the radius of the first section, wherein the two primary cutting edges and the two secondary cutting edges are integrated with the body of the solid step drill, and wherein the recess is delimited by a chip surface in the immediate proximity of the cutting edge line of the secondary cutting edge, as well as by a concave, chip breaking surface situated between the chip surface and the chip flute surface.

4. The step drill according to claim 3, wherein adjacent to the individual primary cutting edge, a chip breaking recess is also formed between a cutting edge line of the primary cutting edge and the concave surface.

5. The step drill according to claim 3, wherein the recess ends in an inner end located at a radial distance from the center axis that is the same as the radius of the first section.

6. The step drill according to claim 5, wherein the recess is a chute, which runs out in the second envelope surface, and is spaced-apart from the cutting edge line of the secondary cutting edge via a reinforcement bevel.

7. The step drill according to claim 5, wherein the recess is delimited by a chip surface in the immediate proximity of the cutting edge line of the secondary cutting edge, as well as by a concave, chip breaking surface situated between the chip surface and the chip flute surface.

8. The step drill according to claim 5, wherein adjacent to the individual primary cutting edge, a chip breaking recess is also formed between a cutting edge line of the primary cutting edge and the concave surface.

* * * * *